(12) United States Patent
Johansson et al.

(10) Patent No.: US 6,341,124 B1
(45) Date of Patent: Jan. 22, 2002

(54) ACCOMMODATING PACKET DATA LOSS AT BASE STATIONS INTERFACING BETWEEN A PACKET SWITCHED NETWORK AND A CDMA MACRODIVERSITY NETWORK

(75) Inventors: Lars B. Johansson, Linköping; Paul Peter Butovitsch, Bromma; Tomas Sandin, Stockholm, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/042,359

(22) Filed: Mar. 13, 1998

(51) Int. Cl.⁷ .................................................. H04B 7/216
(52) U.S. Cl. ........................ 370/335; 370/328; 370/329; 370/466; 455/442
(58) Field of Search .................................. 370/335, 332, 370/342, 252, 397, 466, 328, 329; 455/442, 522, 524, 504, 33.2, 56.1

(56) References Cited

U.S. PATENT DOCUMENTS

| 5,097,484 A | 3/1992 | Akaiwa ........................ 375/40 |
| 5,369,801 A | 11/1994 | Smith ...................... 455/227.1 |
| 5,481,561 A | 1/1996 | Fang ........................... 375/205 |
| 5,507,035 A | 4/1996 | Bantz et al. ................. 455/133 |
| 5,537,411 A * | 7/1996 | Plas ............................ 370/397 |
| 5,586,113 A | 12/1996 | Adachi et al. ............... 370/342 |
| 5,586,119 A | 12/1996 | Scribano et al. ............. 370/350 |
| 5,646,937 A | 7/1997 | Nakano ....................... 370/252 |
| 5,673,259 A | 9/1997 | Quick, Jr. ..................... 370/342 |
| 5,722,074 A * | 2/1998 | Muszynski .................. 455/442 |
| 5,828,659 A * | 10/1998 | Teder et al. ................. 370/328 |
| 5,878,045 A * | 3/1999 | Timbs ......................... 370/466 |
| 6,072,790 A * | 6/2000 | Neumiller et al. ........... 370/332 |
| 6,181,683 B1 * | 1/2001 | Chevillat et al. ............ 370/329 |

FOREIGN PATENT DOCUMENTS

WO          9532594          11/1995         H04Q/7/38

* cited by examiner

*Primary Examiner*—Wellington Chin
*Assistant Examiner*—Prenell Jone
(74) *Attorney, Agent, or Firm*—Jenkens & Gilchrist PC

(57) ABSTRACT

A plurality of base stations are operated in CDMA macrodiversity mode to communicate a message to a mobile station via an air interface. If the message is successfully communicated to one of the base stations via a packet network, the base station communicates the message to the mobile station via the air interface using CDMA. Otherwise, the base station refrains from communicating any message to the mobile station.

19 Claims, 5 Drawing Sheets

TPC + Pilot

Substantive Information
(Message)

ACCOMMODATING PACKET DATA LOSS AT BASE STATIONS INTERFACING BETWEEN A PACKET SWITCHED NETWORK AND A CDMA MACRODIVERSITY NETWORK

FIELD OF THE INVENTION

The invention relates to data transmission from a base station to a mobile telecommunications device using Code Division Multiple Access (CDMA) and, more particularly, to CDMA data transmission from a plurality of base stations operating in macrodiversity mode and connected to a packet switched network.

BACKGROUND OF THE INVENTION

A fundamental principle of conventional CDMA systems is so-called macrodiversity, wherein a plurality of base transceiver stations (base stations) are communicating with one mobile station at the same time via the air interface. This technique, illustrated in FIG. 1, is used, for example, during conventional soft handover procedures when the mobile station is roaming from one base station (i.e. cell) to another. In downlink, the mobile telecommunications device (or mobile station) 11 receives data from all base stations BTS1 and BTS2 that are transmitting to the mobile station via the air interface 13. The mobile station then combines all data received to produce a combined result.

The CDMA frames transmitted by the base stations include conventional control information such as TPC (Transmit Power Control) commands so the mobile station can maintain proper output power, and pilot bits so the mobile station can maintain proper synchronization and perform coherent detection. The CDMA frames also include substantive information, that is, a message that the mobile station will combine with the corresponding message from the corresponding frame (or frames) from the other base station (or base stations). This CDMA macrodiversity technique is well known in the art.

The base stations will normally all transmit their data to the mobile station using CDMA in the air interface and, in the conventional macrodiversity technique, the base stations are synchronized to transmit their data over the air interface so the data from all base stations is received by the mobile station at the same time. If the base stations of FIG. 1 are connected as shown in FIG. 2 to receive packet data from a controlling node 21 in a packet switched network 23, it is possible that, due to the well-known nature of packet switching, one of the base stations will not have received its intended packet data at the time for the next CDMA data transmission over the air interface. It is also possible that one of the base stations will receive from the packet switched network packet data that has been corrupted in the transmission between the node 21 and the base station. Such data corruption is conventionally detected at the base station by using conventional (for example, Cyclic Redundancy Code (CRC)-based) error detection techniques.

In a prior art system, the base station transmits a dummy message (with TPC and pilot bits) in place of packet data that has not been received or has been corrupted, or alternatively, the base station transmits the corrupted message.

In conventional CDMA macrodiversity operation, the mobile station combines the substantive message information received from all of the base stations that are transmitting to the mobile station. When the same substantive message information is received from all of the base stations, the combined result produced by the mobile station is better than the result that would have occurred had less than all base stations transmitted that information to the mobile station. If some of the base stations send the same (correct) information, but one or more of the base stations sends information which differs from the correct information, then the combined result produced by the mobile station will be less reliable than if all base stations had sent the correct information.

It is therefore desirable for every base station to transmit the same, correct message information to the mobile station in CDMA macrodiversity mode.

According to the present invention, only those base stations that receive uncorrupted packet data will transmit message information, so every base station that transmits message information to the mobile station during CDMA macrodiversity mode will transmit the same, correct message information.

DETAILED DESCRIPTION

Figure 1:
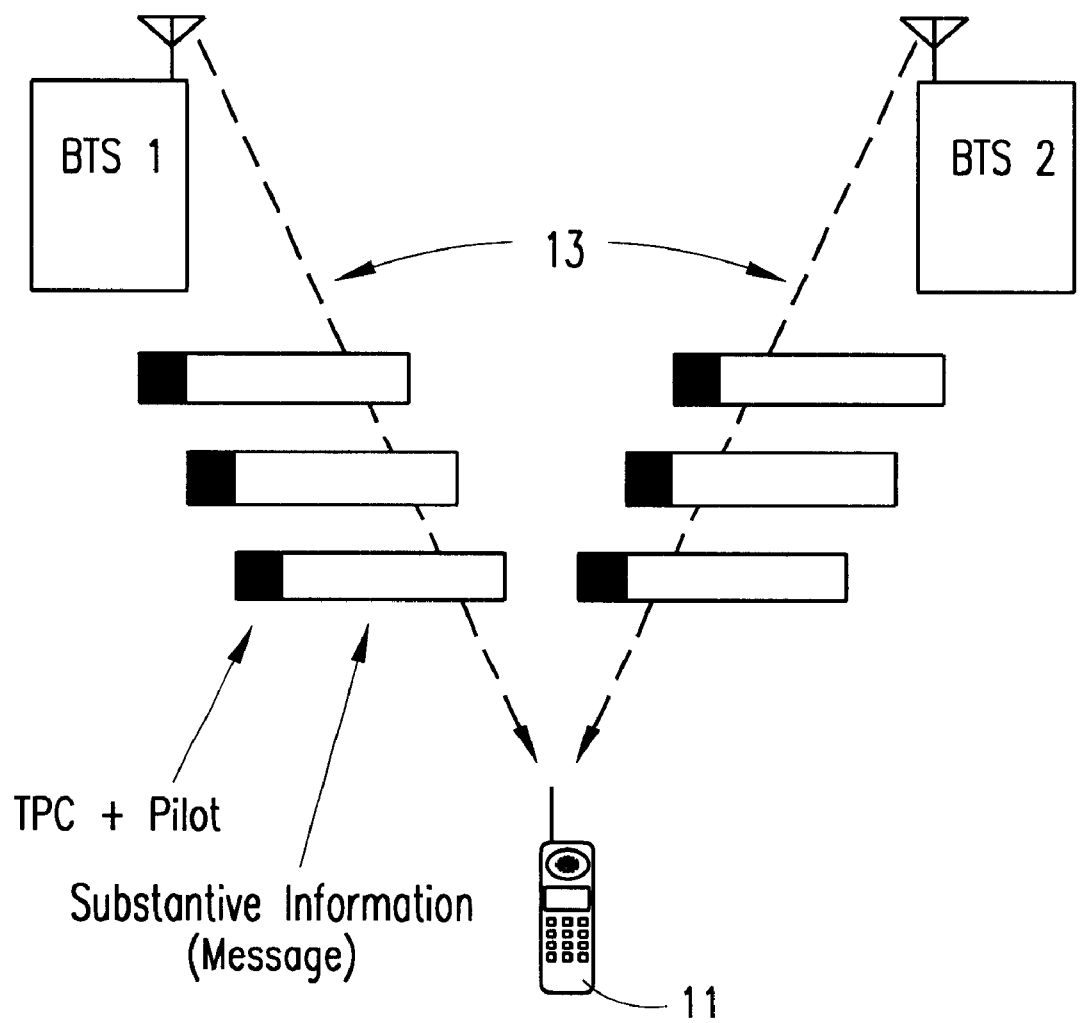
FIG. 1 illustrates conventional CDMA macrodiversity transmission over the air interface.
Figure 2:
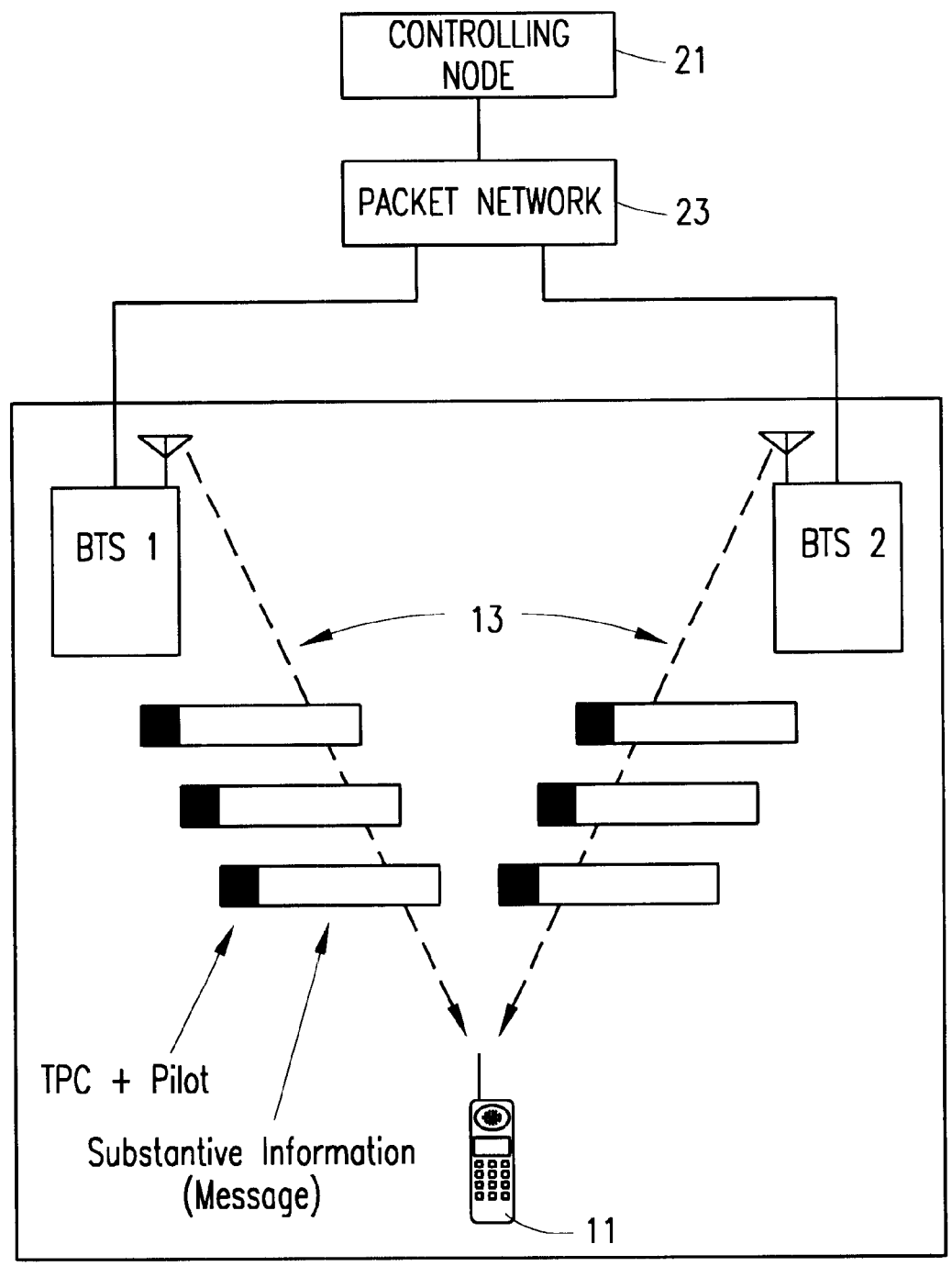
FIG. 2 illustrates the base stations of FIG. 1 connected to a control node via a packet switched network.
Figure 3:
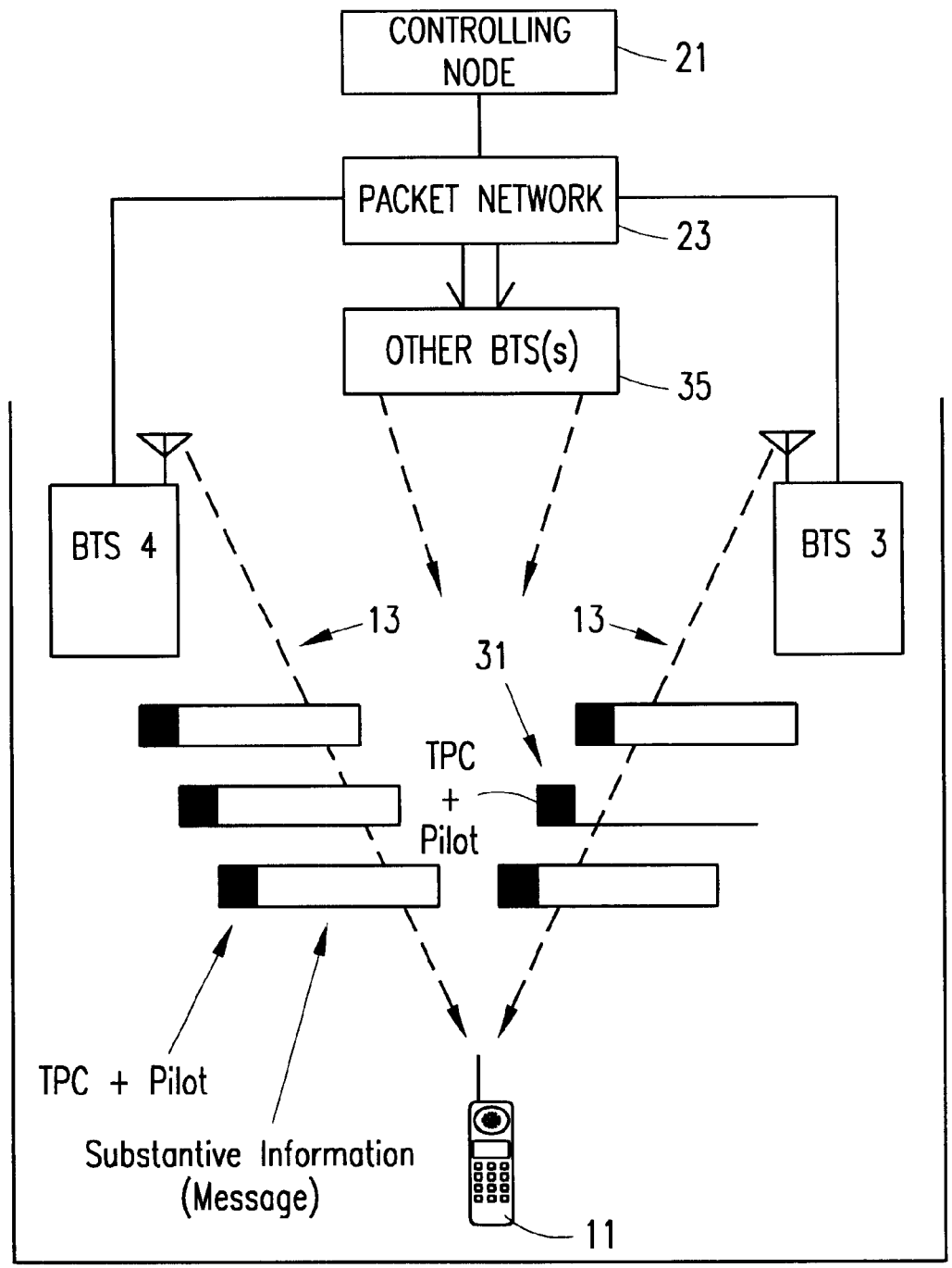
FIG. 3 illustrates CDMA macrodiversity transmission according to the present invention when one of the base stations has not received its correct packet data at CDMA transmission time.

Example FIG. 3 illustrates a plurality of base stations communicating with a mobile station 11 in CDMA macrodiversity transmission mode. Referring specifically to base stations BTS3 and BTS4, when conventional CDMA synchronization control indicates that it is time for CDMA data transmission, if one of the base stations has not yet received all of its correct packet data, or if the packet data received by one of the base stations has been corrupted during transmission through the packet switched network, then it is not possible for that base station to transmit the same information as the other base station which has received all of its intended packet data in uncorrupted form. Accordingly, in order to provide the mobile station with the best chance of receiving the intended information, a base station which has not received all of its correct packet data or has received corrupted packet data, in this example base station BTS3, refrains from sending any substantive message information to the mobile station.

Continuing with specific reference to base stations BTS3 and BTS4, in this example BTS4 has received its intended packet data in uncorrupted form. The mobile station therefore has the best chance of recovering its intended CDMA data if base station BTS3 refrains from transmitting any substantive message information, and only base station BTS4 transmits substantive message information. Conventional pilot bits and TPC commands are preferably sent by base station BTS3 even though no substantive message information is being transmitted, so that the mobile station can properly maintain synchronization and output power.

FIG. 3 illustrates at 31 a CDMA frame that includes only TPC and pilot information, but does not include any substantive message information, in contrast to the other frames, which do include substantive information.

By refraining from sending any substantive message information under the above-described circumstances, the base station BTS3 not only gives the mobile station the best opportunity to receive the message that was intended for it, but also advantageously reduces the total interference level in the CDMA macrodiversity system.

The packet switched network at 23 may be, for example, an ATM (Asynchronous Transfer Mode) network, or a frame relay network. The invention is, however, advantageously applicable in conjunction with other types of packet switched networks as well.

Although only two base stations are shown in detail in example FIG. 3 for clarity of exposition, the invention applies to systems including any number of base stations sending CDMA frames to a mobile station in macrodiversity mode. This is indicated diagrammatically at 35 in FIG. 3. As discussed above, any and all base stations that, at the time for CDMA transmission, have not received their packet data or have received corrupted packet data will refrain from sending substantive message information to the mobile station, while all other base stations that have received uncorrupted packet data will send their complete CDMA frames to the mobile station as usual. In this manner, every base station that transmits substantive message information will transmit the same, correct message information. This provides the best chance for the mobile station to recover the intended message.

Figure 4:
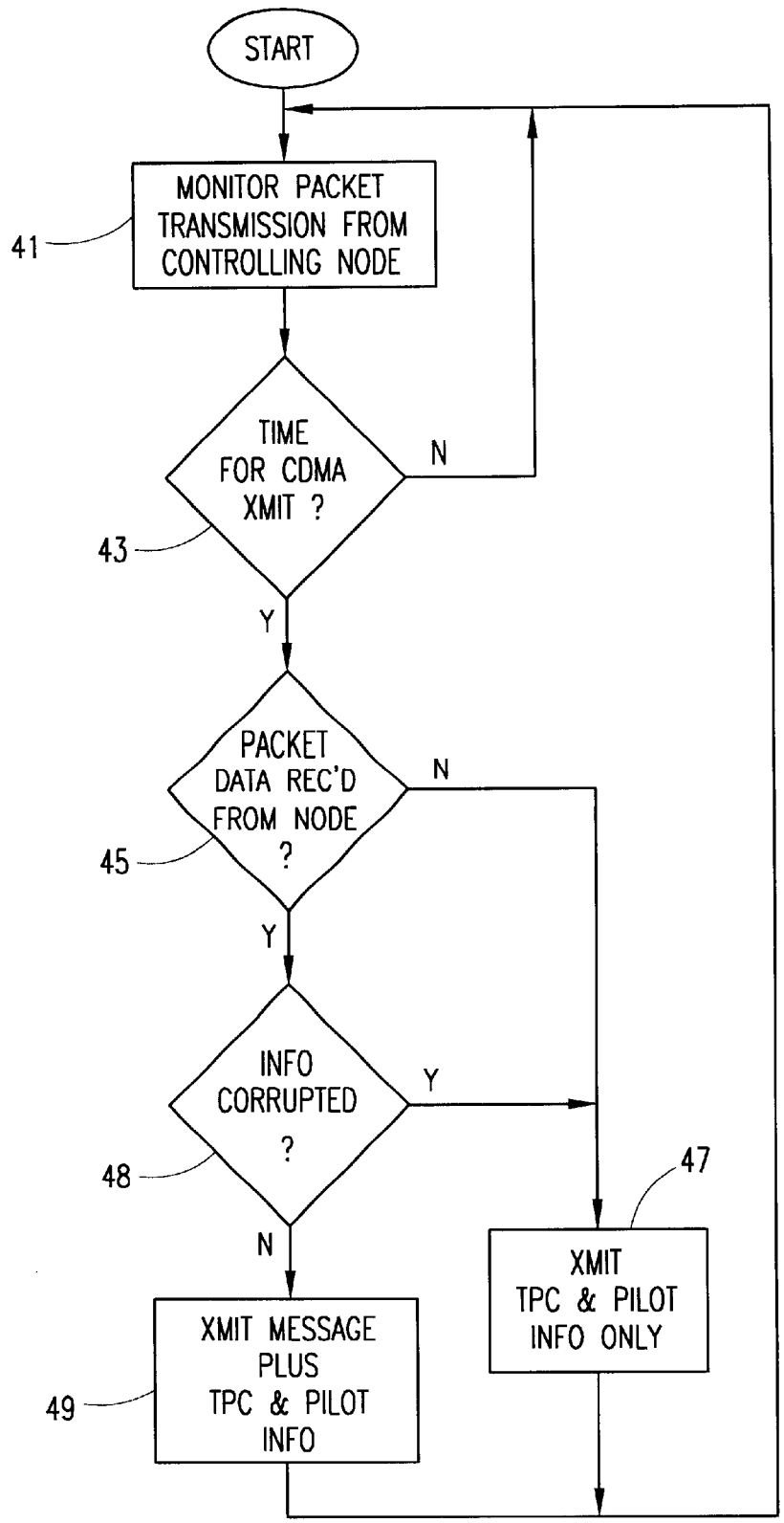
FIG. 4 is a flow diagram which illustrates how the base stations of FIG. 3 interface between the packet switched network and the CDMA macrodiversity air interface.

Example FIG. 4 illustrates the operation of the base stations of FIG. 3. At 41, each base station monitors packet transmissions from the control node. At 43, the base station determines whether it is time to transmit CDMA data via the air interface. If not, then the base station continues to monitor packet transmissions from the control node. If it is time to transmit over the air interface at 43, then it is determined at 45 whether the packet data has been received from the control node. If not, then the base station transmits at 47 only the TPC and pilot information, but does not transmit any substantive message information that would interfere with the mobile station's ability to receive the substantive message information transmitted by another base station which has received its packet data in uncorrupted form.

If the packet data has been received from the control node at 45, then it is determined at 48 whether or not the information received via packet transmission is corrupted. If so, then the base station at 47 transmits only the TPC and pilot information, and transmits no substantive message information. If the information has not been corrupted at 48, then the base station at 49 transmits the substantive message information, along with the TPC and pilot information, to the mobile station.

Figure 5:
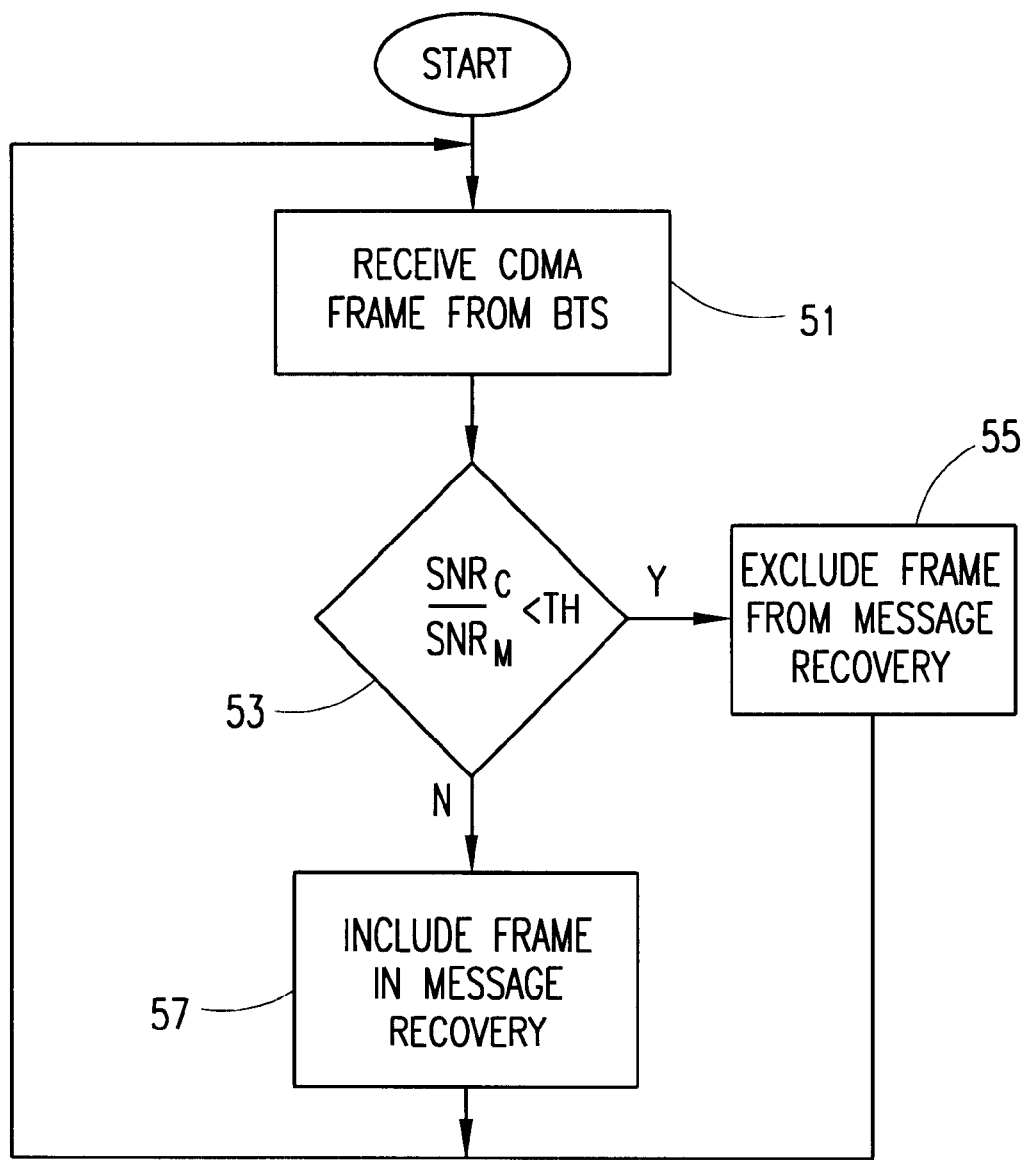
FIG. 5 is a flow diagram which illustrates how a mobile station can determine whether a base station has transmitted any message information.

The ability of the mobile station to recover the intended message can be further enhanced by the example procedure illustrated in FIG. 5. The FIG. 5 procedure permits the mobile station to determine whether a CDMA frame received at the mobile station is of the type illustrated at 31 in FIG. 3, namely a frame without any substantive message information.

After receiving the frame at 51 in FIG. 5, the mobile station determines the signal-to-noise ratio $SNR_M$ of a message portion of the frame and the signal-to-noise ratio $SNR_C$ of a control portion of the frame, and compares these ratios at 53. $SNR_C$ can represent, for example, the average signal-to-noise ratio associated with the following exemplary control signals received in the frame: TPC commands; pilot bits; and rate information. TPC commands and pilot bits are described above, and rate information refers to rate of user data and channel coding information. See, for example, Volume 3 Specification of Air-interface for a 3G (generation) Mobile system Ver. 0 issued by ARIB on Dec. 18, 1997. As with TPC commands and pilot bits, rate information can be transmitted to the mobile station when substantive message information is included in the transmission, and also when no substantive message information is included.

$SNR_M$ will be relatively low compared to $SNR_C$ when the base station has not transmitted any substantive message information, because the mobile station will receive only noise where the message signaling would otherwise have been expected to occur. However, even this noise can, at least to some extent, impair the ability of the mobile station to recover the intended message from the message signaling of other base stations. Thus, if the ratio of $SNR_C$ to $SNR_M$ exceeds a threshold value TH at 53, then the message portion of the frame is assumed to be noise only, and the frame is excluded at 55 from the conventional message recovery processing of the mobile station. If the ratio at 53 is less than the threshold TH, this indicates that a substantive message is present in the frame, and the frame is therefore included at 57 in the conventional message recovery processing of the mobile station. An appropriate value or values for the threshold TH can be empirically determined for suitability to the characteristics of the anticipated operating environment.

It will be clearly evident to workers in the art that the above-described operation of base stations BTS3 and BTS4 can be readily implemented in hardware, software, or a combination thereof in the data processing portion of a conventional base station, and the above-described operation of mobile station 11 can be readily implemented in hardware, software, or a combination thereof in the data processing portion of a conventional mobile station.

Although exemplary embodiments of the present invention have been described above in detail, this does not limit the scope of the invention, which can be practiced in a variety of embodiments.

What is claimed is:

1. A method of operating a plurality of base stations in Code Division Multiple Access macrodiversity mode to communicate a message to a mobile station via an air interface, comprising:

attempting to communicate the message to the base stations via a packet network;

determining, at one of the base stations, whether the message is corrupted after the attempted communication from packet network to the one base station;

if the message is not successfully communicated by the packet network to one of the base stations, refraining from communicating any message from the one base station to the mobile station; and if the message is successfully communicated by the packet network to the one base station, communicating the message from the one base station to the mobile station via the air interface using Code Division Multiple Access.

2. The method of claim 1, including, for each base station, determining whether a message from the packet network was received by the base station.

3. The method of claim 1, including, if the message was not successfully communicated via the packet network to the one base station, communicating synchronization information from the one base station to the mobile station via the air interface using Code Division Multiple Access.

4. The method of claim 1, including, if the message was not successfully communicated via the packet network to the one base station, communicating transmission power management information from the one base station to the mobile station via the air interface using Code Division Multiple Access.

5. The method of claim 1, wherein the packet network is an Asynchronous Transfer Mode network.

6. A method of operating a plurality of base stations in Code Division Multiple Access macrodiversity mode to communicate a message to a mobile station via an air interface, comprising:

attempting to communicate the message to the base stations via a packet switched network;

for each base station, determining, at each said base station, whether the message was successfully communicated to and received in an uncorrupted manner by the base station via the packet network;

for each base station to which the message was successfully communicated via the packet network, communicating the message from the base station to the mobile station via the air interface using Code Division Multiple Access; and for each base station to which the message was not successfully communicated via the packet network, refraining from communicating any message from the base station to the mobile station.

7. The method of claim 6, including, for each base station to which the message was not successfully communicated via the packet network, communicating synchronization information from the base station to the mobile station via the air interface using Code Division Multiple Access.

8. The method of claim 6, including, for each base station to which the message was not successfully communicated via the packet network, communicating transmission power management information from the base station to the mobile station via the air interface using Code Division Multiple Access.

9. The method of claim 6, wherein the packet network is an Asynchronous Transfer Mode network.

10. A method of using Code Division Multiple Access macrodiversity mode to perform a soft handover of a mobile station between a first and a second base stations, comprising:

attempting to communicate a message to the first and second base stations via a packet network;

determining at the first base station whether the communicated message is corrupted after communication from the packet network to said first base station; and if the message is successfully communicated by the packet network to the first base station, communicating the message from the first base station to the mobile station via the air interface using Code Division Multiple Access;

if the message is not successfully communicated by the packet network to the first base station, refraining from communicating any message from the first base station to the mobile station;

determining at said second base station whether the communicated message is corrupted after communication from the packet network to said second base station;

if the message is successfully communicated by the packet network to the second base station, communicating the message from the second base station to the mobile station via the air interface using Code Division Multiple Access; and if the message is not successfully communicated by the packet network to the second base station, refraining from communicating any message from the second base station to the mobile station.

11. The method of claim 10, including, if the message was not successfully communicated via the packet network to the second base station, communicating synchronization information from the second base station to the mobile station via the air interface using Code Division Multiple Access.

12. The method of claim 10, including, if the message was not successfully communicated via the packet network to the second base station, communicating power transmission management information from the second base station to the mobile station via the air interface using Code Division Multiple Access.

13. The method of claim 10, wherein the packet network is an Asynchronous Transfer Mode network.

14. The method of claim 10, wherein the packet network is a frame relay network.

15. The method of claim 1, wherein the packet network is a frame relay network.

16. The method of claim 6, wherein the packet network is a frame relay network.

17. The method of claim 1, including, if the message was not successively communicated via the packet network to the one base station, using a control portion of a Code Division Multiple Access frame to communicate control information from the one base station to the mobile station via the air interface, and thereafter determining at the mobile station that the one base station has communicated control information but not message information to the mobile station, including comparing at the mobile station the respective signal-to-noise ratios of the control portion and a message portion of the Code Division Multiple Access frame.

18. The method of claim 6, including, for each base station to which the message was not successively communicated via the packet network, using a control portion of a Code Division Multiple Access frame to communicate control information from the base station to the mobile station via the air interface, and thereafter determining at the mobile station that the base station has communicated control information but not message information to the mobile station, including comparing at the mobile station the respective signal-to-noise ratios of the control portion and a message portion of the Code Division Multiple Access frame.

19. The method of claim 10, including, if the message was not successively communicated via the packet network to the second base station, using a control portion of a Code Division Multiple Access frame to communicate control information from the second base station to the mobile station via the air interface, and thereafter determining at the mobile station that the second base station has communicated control information but not message information to the mobile station, including comparing at the mobile station the respective signal-to-noise ratios of the control portion and a message portion of the Code Division Multiple Access frame.

* * * * *